(12) United States Patent
Lin

(10) Patent No.: US 8,598,751 B2
(45) Date of Patent: Dec. 3, 2013

(54) GENERATOR WITH INTEGRATED BLOWER

(75) Inventor: Frank Lin, Torrance, CA (US)

(73) Assignee: Honeywell International Inc., Morristown, NJ (US)

( * ) Notice: Subject to any disclaimer, the term of this patent is extended or adjusted under 35 U.S.C. 154(b) by 310 days.

(21) Appl. No.: 13/103,786

(22) Filed: May 9, 2011

(65) Prior Publication Data

US 2012/0286599 A1 Nov. 15, 2012

(51) Int. Cl.
*H02K 9/00* (2006.01)

(52) U.S. Cl.
USPC .............................................. 310/63; 310/62

(58) Field of Classification Search
USPC ........ 310/58, 62–63; 416/180, 183, 185, 188, 416/203, 223 B
IPC ................. H02K 009/04,009/06; F01D 005/04, F01D 005/06
See application file for complete search history.

(56) References Cited

U.S. PATENT DOCUMENTS

| | | | |
|---|---|---|---|
| 2,943,839 A * | 7/1960 | Birmann | 415/192 |
| 3,289,920 A | 12/1966 | Boivie | |
| 3,648,086 A * | 3/1972 | Renner et al. | 310/63 |
| 3,841,791 A * | 10/1974 | Doolin | 415/175 |
| 4,324,529 A | 4/1982 | Nickels | |
| 4,673,331 A | 6/1987 | Kolb | |
| 4,917,572 A | 4/1990 | Van Houten | |
| 5,263,816 A * | 11/1993 | Weimer et al. | 415/131 |
| 6,296,446 B1 | 10/2001 | Ishijima et al. | |
| 6,471,475 B1 | 10/2002 | Sasu et al. | |
| 6,685,430 B2 | 2/2004 | Chapman | |
| 7,866,945 B2 | 1/2011 | Ishihara et al. | |
| 2002/0136634 A1 * | 9/2002 | Chapman | 415/208.2 |

* cited by examiner

*Primary Examiner* — Thanh Lam
(74) *Attorney, Agent, or Firm* — Shimokaji & Assoc., P.C.

(57) ABSTRACT

An air-cooled generator may be provided with a centrifugal blower configured for rotation on a shaft of the generator. The centrifugal blower may have an axially oriented outlet. An impeller of the blower may have blades with trailing edges oriented at an angle between 80° to about 90° relative to an axis of the shaft of the generator.

18 Claims, 4 Drawing Sheets

GENERATOR WITH INTEGRATED BLOWER

BACKGROUND OF THE INVENTION

The present invention generally relates to air-cooled high speed electrical generators with integral blowers.

Compact high-power generators are desirable for many aircraft applications. Proper cooling of such generators is made challenging as evolving design requirements for such machines have resulted in increasingly smaller and more compact generators. High-power-density generators may require high pressure head to push cooling air through narrow cooling paths. Integrated centrifugal blowers attached directly to a generator shafts are often employed for cooling such generators. While centrifugal blowers may provide high pressure rise with high efficiency, they typically have radial exits. Thus output from these centrifugal blowers may not be aligned with cooling paths in the generator, many of which may be oriented axially. Output flow may be changed to an axial direction with a radial-to-axial diffuser. However such diffusers take up space in a generator and may produce significant pressure loss when employed in small spaces of a compact generator.

As can be seen, there is a need for a compact high-speed generator in which pressurized cooling air may be directed axially into cooling paths of the generator without use of a radial-to-axial diffuser.

SUMMARY OF THE INVENTION

In one aspect of the present invention, an air-cooled generator may comprise a centrifugal blower with an impeller configured for rotation on a shaft of the generator, the centrifugal blower having an axially oriented outlet.

In another aspect of the present invention, a centrifugal blower may comprise: an impeller rotatable about an axis; a plurality of blades attached to a body of the impeller, wherein the blades have trailing edges oriented at an angle between about 80° to about 90° relative to the axis.

In still another aspect of the invention, a method for cooling a generator may comprise the steps of: rotating an impeller attached to a shaft of the generator to compress air against a shroud attached to a housing of the generator; and discharging the compressed air directly from trailing edges of blades of the impeller in a direction parallel to an axis of the generator.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention generally provide a compact high-speed generator with an integral centrifugal blower having an axially oriented outlet for pressurized cooling air.

Figure 1:
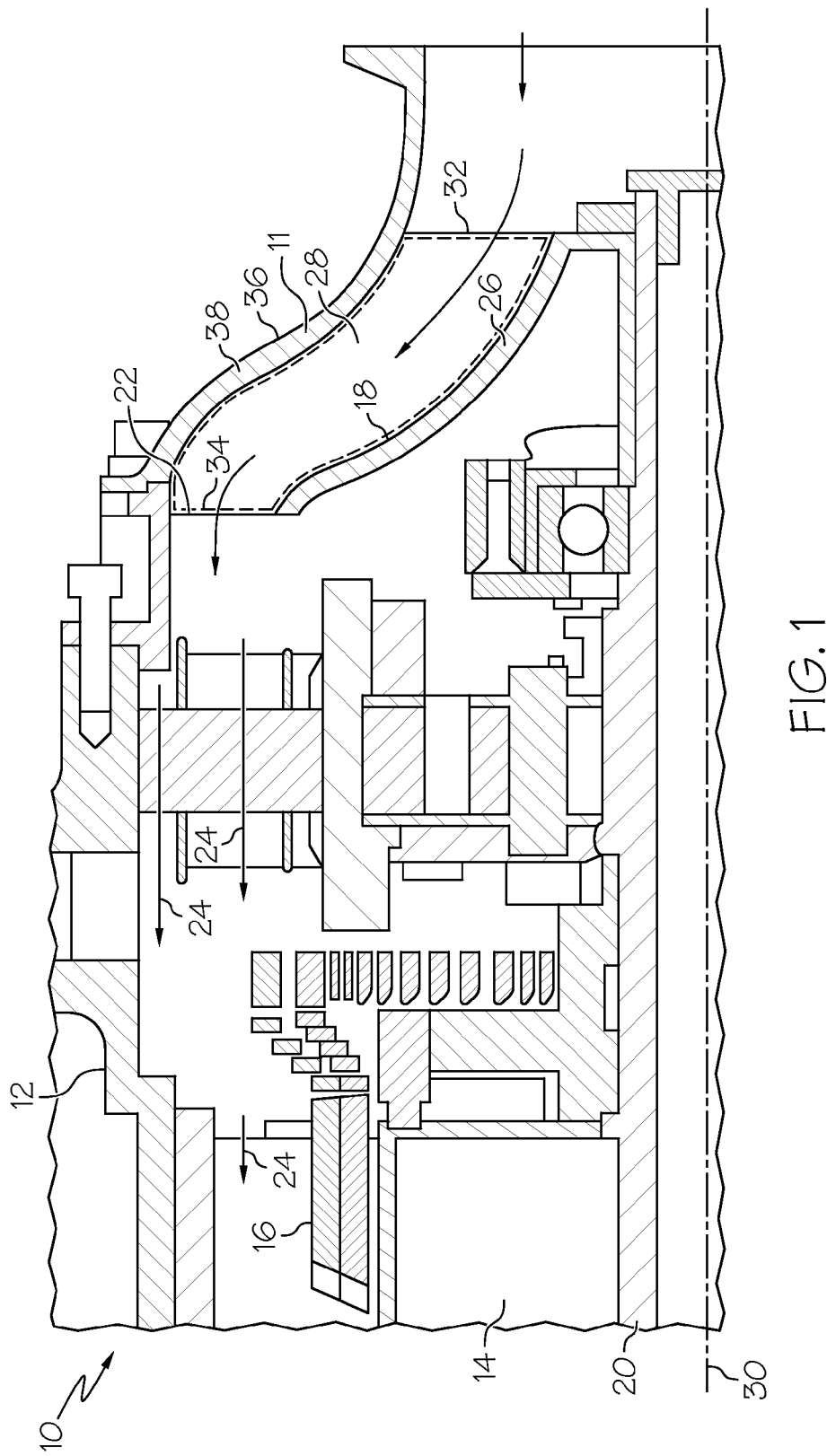
FIG. 1 is a partial cross-sectional view of an air-cooled generator in accordance with an embodiment of the invention.

Referring now to FIG. 1, an exemplary embodiment of a generator 10 may comprise a centrifugal blower 11, a housing 12, a rotor 14 and a stator 16. A blower impeller 18 may be attached to rotate with a shaft 20 of the rotor 14.

In an exemplary embodiment of the generator 10, rotational speed may be about 12,000 rpm. Consequently, the impeller 18 may be designed to produce a desired mass flow at a desired pressure when rotated at the rotational speed of the generator 10. An outlet 22 of the impeller 18 may be positioned at one end of the generator 10 so that pressurized air emerging from the impeller 18 may flow axially along cooling paths 24 (indicated by arrows 24) through the generator 10.

Figure 2:
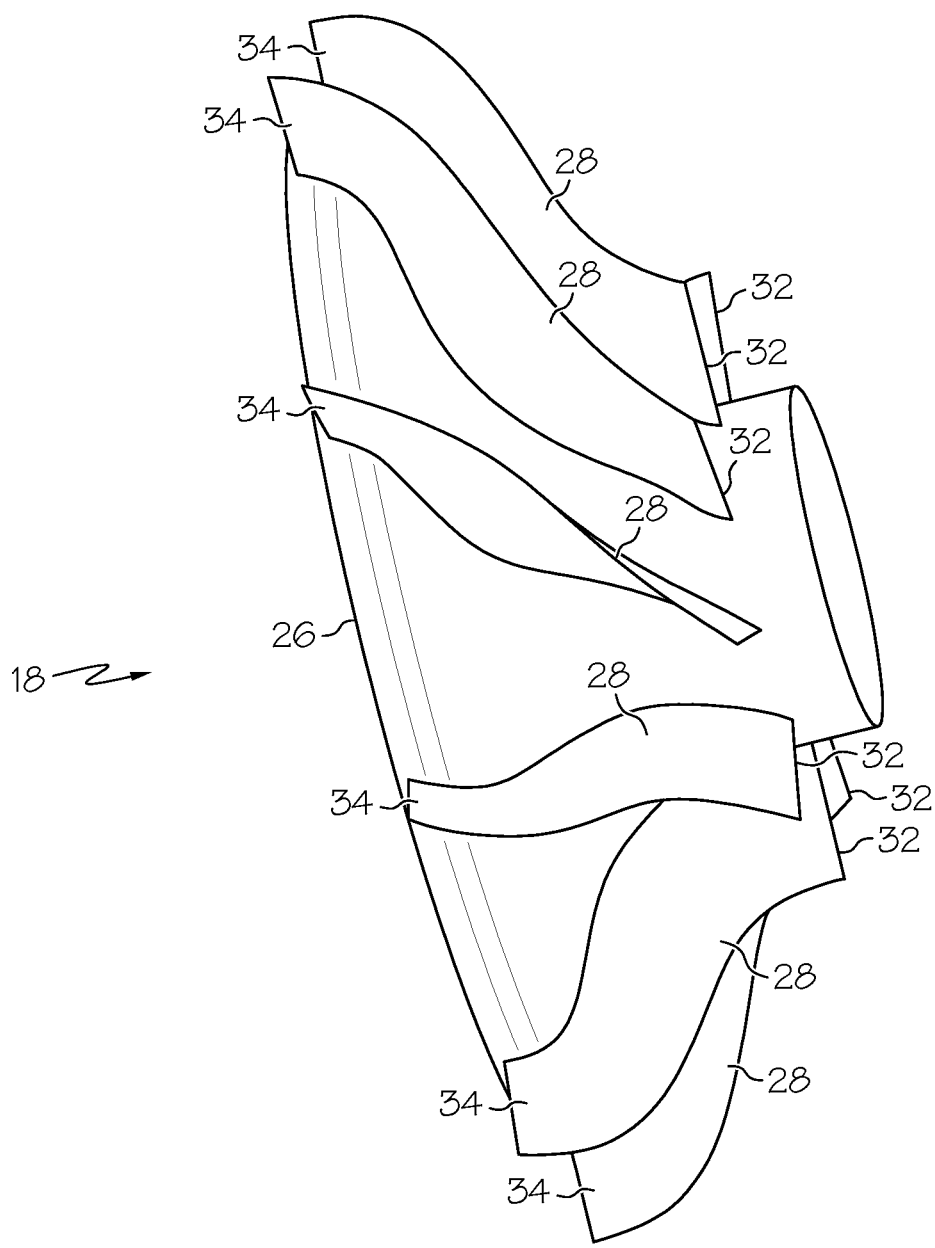
FIG. 2 is a perspective view of an impeller for a centrifugal blower in accordance with an embodiment of the invention.

Referring now to FIG. 2, it may be seen that an exemplary embodiment of the impeller 18 may comprise a body 26 and a plurality of blades 28. Referring back to FIG. 1, it may be seen that leading edges 32 of the blades 28 may be oriented at an angle of about 80° to about 90° relative to an axis 30 of the generator 10. Trailing edges 34 of the blades 28 may be oriented at an angle of about 80° to about 90° relative to the axis 30. Because the trailing edges 34 may be substantially normal to the axis 30, pressurized air may emerge from the impeller 18 as axially oriented cooling-air flow.

It may be noted that a shroud region 36 (hereinafter shroud 36) of the housing 12 may be shaped to provide a uniform clearance from the blades 28. The clearance may be 0.010 inch to about 0.030 inch. Clearances in this range may be small enough to provide minimal pressure loss while still being large enough to accommodate normal variations in dimensions of components that arise during manufacturing and assembly. It may also be noted that the shroud 36 may be produced as a separate component and bolted to the housing 12 during assembly of the generator 10. When the impeller 18 and the shroud 36 are assembled together, the combination of these elements may comprise a centrifugal blower 38.

Figure 3:
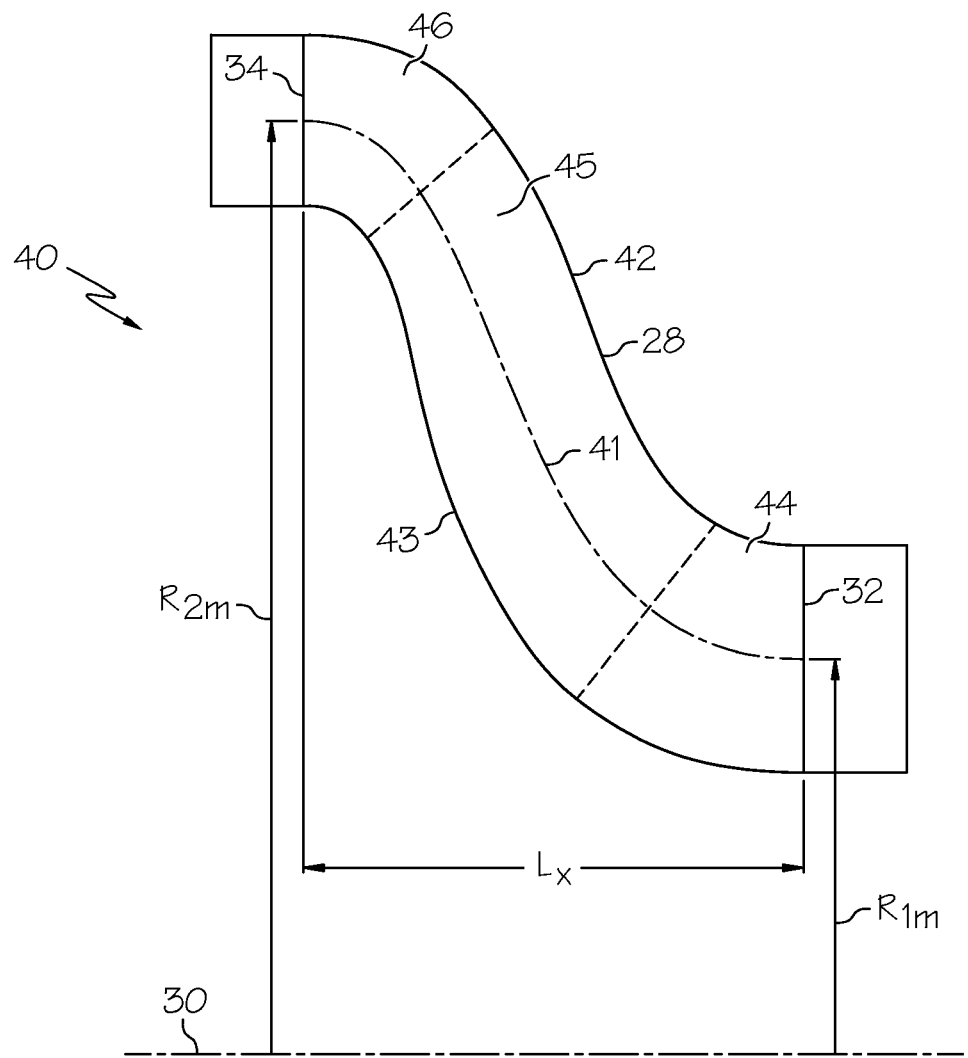
FIG. 3 is a meridional profile diagram of an impeller blade in accordance with an embodiment of the invention.

Referring now to FIG. 3, a meridional profile diagram 40 may illustrate various features of an exemplary embodiment of the blades 28 of the impeller 18. In the embodiment of FIG. 3, the blades 28 may be shaped in accordance with a relationship:

$$\epsilon = (R_{2m} - R_{1m})/Lx,$$

where:

$R_{2m}$ is blade mean radius (relative to the axis 30) at the trailing edge 34;

$R_{1m}$ is blade mean radius (relative to the axis 30) at leading edge 32;

Lx is the blade axial length; and $\epsilon$ may be greater than 0.5.

Along a mean streamline 41 from blade leading edge 32 to trailing edge 34, the blade 28 may comprise three sections. An inducer portion 44 which may contain the blade leading edge 32 and a small length of blade with slightly growing mean streamline radius. The inducer portion 44 may suck in ambient air to the impeller 18 from an axial direction and may turn the air it into a slightly radial direction. A mid portion 45 may be constructed with a rapid radial dimension increase within a relatively short axial distance. The mid portion 45 may provide energy transfer by imparting energy from the impeller 18 to the air stream by accelerating the flow via centrifugal effect associated with radial displacement change. An exducer portion 46 at an exit end of the blade 28 may contain the blade trailing edge 34 and a mean streamline with slightly growing radius. The exducer portion 46 may further compress the air while redirecting the flow to an axial direction to match the orientation of the generator cooling path entrance. Shape of the blade 28 may also be defined by a tip contour 42 and a hub contour 43. Both contours 42 and 43 may be defined by smooth spline curves with their tangents at the blade leading edge 32 and trailing edge 34 parallel to or nearly parallel to the generator rotating axis 30. The blade tip contour 42 may conform to the contour of the stationary shroud 36 of the housing 12 to form a preset uniform tip clearance.

Figure 4:
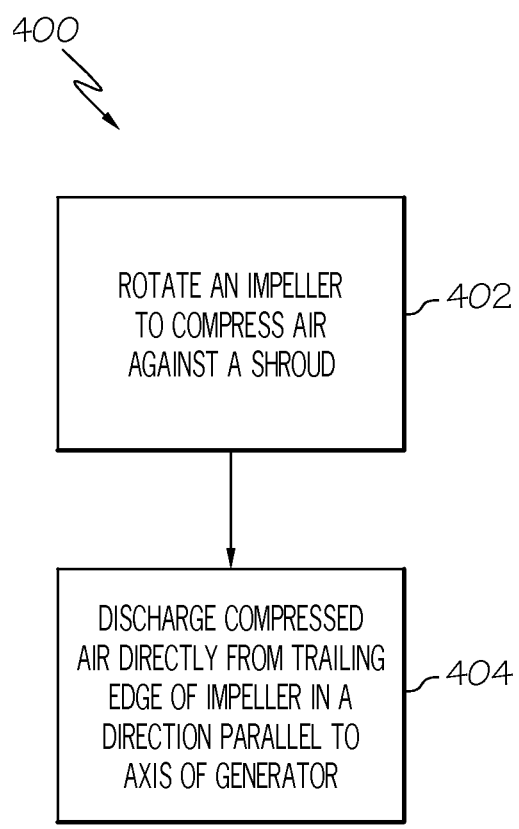
FIG. 4 is a flow chart of a method for cooling a generator in accordance with an embodiment of the invention.

Referring now to FIG. 4, a flow chart 400 may illustrate an exemplary method which may be employed for cooling a generator. In a step 402, an impeller, attached to a shaft of the generator, may be rotated to compress air against a shroud attached to a housing of the generator (e.g., the impeller 18 may be rotated on the shaft 20 of the generator 10 to compress air against the shroud 36). In a step 404, the compressed air may be discharged directly from a trailing edge of the impeller in a direction parallel to an axis of the generator (e.g., the air may be discharged into the cooling paths 24 directly from trailing edges 34 of the impeller 18).

It should be understood, of course, that the foregoing relates to exemplary embodiments of the invention and that modifications may be made without departing from the spirit and scope of the invention as set forth in the following claims.

I claim:

1. An air-cooled generator comprising a centrifugal blower with an impeller configured for rotation on a shaft of the generator, the centrifugal blower having an axially oriented outlet,
wherein the impeller has a plurality of blades, and the middle of each of the plurality of blades has a greater change in radius than a top end or a bottom end of each of the plurality of blades.

2. The generator of claim 1 wherein the centrifugal blower comprises an impeller attached to the shaft with blades having trailing edges oriented at an angle between about 80° to about 90° relative to an axis of the shaft.

3. The generator of claim 1 wherein the impeller attached to the shaft which comprises blades having trailing edges oriented at an angle of 90° relative to an axis of the shaft.

4. The generator of claim 1 wherein the centrifugal blower comprises:
the impeller with a plurality of blades, the impeller being attached to the shaft of the generator;
a shroud positioned at a clearance distance of about 0.010 inch to about 0.030 inch away from the blades.

5. The generator of claim 4 wherein the shroud is bolted to a housing of the generator.

6. The generator of claim 4 wherein the shroud is formed integrally with a housing of the generator.

7. The generator of claim 1 wherein the impeller comprises blades having leading edges oriented at an angle between about 80° to about 90° relative to an axis of the shaft.

8. The generator of claim 1 wherein the impeller comprises blades having leading edges oriented at an angle of 90° relative to an axis of the shaft.

9. The generator of claim 1 wherein the impeller comprises blades having leading edges oriented at an angle between about 80° to about 90° relative to an axis of the shaft and trailing edges oriented at an angle between about 80° to about 90° relative to the axis of the shaft.

10. The generator of claim 1 wherein the impeller comprises blades having trailing edges oriented at an angle of 90° relative to an axis of the shaft and leading edges oriented at an angle of 90° to the axis of the shaft.

11. The generator of claim 1 wherein the impeller comprises blades having a meridional profile in accordance with the expression $\epsilon=(R_{2m}-R_{1m})/Lx$ where:
$R_{2m}$ is blade mean radius relative to an axis of the shaft at a trailing edge of the blade;
$R_{1m}$ is blade mean radius relative to the axis at a leading edge of the blade;
Lx is axial length of the blade; and
$\epsilon$ is greater than 0.5.

12. The generator of claim 11 wherein the trailing edges are oriented at an angle between about 80° to about 90° relative to the axis of the shaft.

13. The generator of claim 11 wherein the trailing edges and the leading edges are oriented at an angle between about 80° to about 90° relative to the axis of the shaft.

14. The generator of claim 11 wherein the blades comprise:
an inducer portion;
a radial portion; and
an exducer portion.

15. A centrifugal blower comprising:
an impeller rotatable about an axis;
a shroud surrounding the impeller;
a plurality of blades attached to a body of the impeller,
wherein the blades have trailing edges oriented at an angle between about 80° to about 90° relative to the axis, and
wherein the blades have a tip contour such that the tip contour conforms to a contour of the shroud.

16. The centrifugal blower of claim 15 wherein the blades have leading edges oriented at an angle between about 80° to about 90° relative to the axis.

17. The centrifugal blower of claim 16 wherein the blades have a meridional profiles in accordance with the expression $\epsilon=(R_{2m}-R_{1m})/Lx$ where:
$R_{2m}$ is blade mean radius relative to the axis at the trailing edge of the blade;
$R_{1m}$ is blade mean radius relative to the axis at the leading edge of the blade;
Lx is axial length of the blade; and
$\epsilon$ is greater than 0.5.

18. The centrifugal blower of claim 16 wherein the blades have trailing edges oriented at an angle of 90° relative to the axis.

* * * * *